United States Patent [19]

Hripcsak

[11] Patent Number: 5,555,191
[45] Date of Patent: Sep. 10, 1996

[54] AUTOMATED STATISTICAL TRACKER

[75] Inventor: George Hripcsak, New York, N.Y.

[73] Assignee: Trustees of Columbia University in the City of New York, New York, N.Y.

[21] Appl. No.: 321,785

[22] Filed: Oct. 12, 1994

[51] Int. Cl.$^6$ ..................................... A61B 5/02
[52] U.S. Cl. ................. 364/514 R; 128/670; 128/671; 364/550; 340/501
[58] Field of Search ................... 128/670, 671; 364/413.02, 550, 514 R; 340/501

[56] References Cited

U.S. PATENT DOCUMENTS

| | | | |
|---|---|---|---|
| 4,545,388 | 10/1985 | John | 128/731 |
| 4,651,748 | 3/1987 | Vinogradov et al. | 128/680 |
| 4,818,884 | 4/1989 | Saubolle | 250/388 |
| 4,823,290 | 4/1989 | Fasack et al. | 364/550 |
| 4,833,450 | 5/1989 | Buccola et al. | 340/506 |
| 4,974,598 | 12/1990 | John | 128/696 |
| 5,027,817 | 7/1991 | John | 128/653 R |
| 5,077,582 | 12/1991 | Kravette et al. | 355/206 |
| 5,199,439 | 4/1993 | Zimmerman et al. | 128/670 |
| 5,311,876 | 5/1994 | Olsen et al. | 128/731 |
| 5,355,889 | 10/1994 | Nevo et al. | 128/671 |
| 5,442,940 | 8/1995 | Secker et al. | 128/670 |
| 5,455,561 | 10/1995 | Brown | 340/541 |

OTHER PUBLICATIONS

Ketikidis et al., "ARRES: Computer Assisted Post Anesthesia Care Unit Monitoring System", 1989.

Hripcsak, "Monitoring the Monitor: Automated Statistical Tracking of a Clinical Event Monitor", Oct. 13, 1993.

Therapeutic Antibiotic Monitoring: Surveillance Using a Computerized Expert System, Stanley L. Pestotnik, R.Ph., et al., The American Journal of Medicine, Jan. 1990, vol. 88, pp. 43–48.

The Arden Syntax for Medical Logic Modules, George Hripcsak, et al., Proceedings of the Fourteenth Annual Symposium on Computer Applications in Medical Care, (IEEE Computer Society Press, 1990), pp. 200–204.

*Primary Examiner*—Ellis B. Ramirez
*Assistant Examiner*—Patrick J. Assouad
*Attorney, Agent, or Firm*—Brumbaugh, Graves, Donohue & Raymond

[57] ABSTRACT

A method for automatically monitoring a system to detect malfunctions, wherein said system generates messages based upon selected data, comprising the steps of receiving messages generated by said system, counting said messages over statistically significant time periods to form message subgroups including selected numbers of messages, comparing the number of messages in each of said subgroups with predefined limits for that subgroup to determine whether said number of messages in that subgroup is statistically unusual, and generating an alert signal whenever a statistically unusual number of messages is detected.

34 Claims, 5 Drawing Sheets

AUTOMATED STATISTICAL TRACKER

The U.S. Government has certain rights in this invention pursuant to the terms of contract No. LM04419 awarded by the National Library of Medicine.

BACKGROUND OF THE INVENTION

I. Field of the Invention

The present invention relates to the computerized monitoring of a system, and more specifically, to the automatic detection of system malfunctions through statistical analysis. The present invention particularly relates to such computerized monitoring in a medical environment.

II. Description of the Related Art

In a medical environment, health care providers often rely on computers for the purpose of monitoring one or more of a patient's characteristics. For example, U.S. Pat. No. 5,199,439, discloses a method of using medical and computer equipment to derive statistical charts which reflect changes in a monitored patient. Under this method, data from a monitored patient is collected in a time delayed manner, so that a computer is provided with several samples of data for each monitored event (e.g., blood pressure). When a statistically significant group of data is collected, the data is analyzed to determine "control limits," (e.g. at one standard deviation from normal) so that statistically significant deviations in the patient's condition can be monitored. Alternatively, the patient's data can be compared to data stored in a database to make the same determination. This method thus provides a physician an early warning system when the patient goes into an unstable condition, by indicating, e.g., that the patient's temperature has changed by a statistically significant amount.

Other art describes the use of computers to monitor a specific human system. U.S. Pat. No. 4,651,748, discloses a method for determining the state of a cardiovascular system by measuring and processing quantitative blood supply parameters and comparing these parameters with statistical average ranges established for the parameters. U.S. Pat. No. 5,027,817, discloses a method of presenting a statistically evaluated display which is obtained from Positron Emission Tomography (PET) scan data; a group of healthy subjects are used to provide reference data which is transformed into a Gaussian distribution for comparison with the patient's data. U.S. Pat. No. 4,534,388, discloses a method for monitoring the brain functions of a patient during a medical procedure relative to the patient's self-norm by taking a statistically significant sample of the patient's relevant brain functions prior to the initiation of a medical procedure, and comparing that sample with the patient's relevant brain functions during the procedure. U.S. Pat. No. 4,974,598, discloses a method in electrocardiographic (EKG) analysis for the early detection of certain heart diseases, by comparing EKG signals with the patient's self-norm "typical beat" and to data collected from a normal population group. The article by S. Pestotnik et al., "Therapeutic Antibiotic Monitoring: Surveillance Using a Computerized Expert System," *The American Journal of Medicine,* January 1990, Vol. 88, pp. 43–48, discloses a computerized system for monitoring therapeutic antibiotics in a hospital setting by generating a report alerting physicians that patient's antibiotic therapies are potentially inappropriate in light of current in vitro sensitivity data.

Health care providers also rely on computers to make daily decisions regarding health management. For example, the article by Hripcsak, G., et al., "The Arden Syntax for Medical Logic Modules," *Proceedings of the Fourteenth Annual Symposium on Computer Applications in Medical Care,* pp 200–204 (IEEE Computer Society Press, 1990) (incorporated herein by reference), describes a set of rules called Medical Logic Modules ("MLMs"), written in the Arden Syntax, which are used in a hospital's clinical event monitor. Whenever a medical event occurs (including administrative transactions like admissions, discharges, transfers, and outpatient visits; operative procedures; orders for items like medications and diagnostic tests; and the storage of clinical results of diagnostic tests), the MLMs that are pertinent to the event are triggered. The MLMs generally read data from the hospital patient database, test a set of criteria and, if those criteria are satisfied, performs some action such as sending a message via electronic-mail, storing a message in the patient database, or triggering other MLMS. MLMs typically generate drug contraindication warnings, abnormal value indications, laboratory interpretations, screening for research studies, reports for quality assurance, etc. However, as with any automated process, MLM's can and do generate erroneous messages.

There are several different ways that a malfunction can occur. A clinical information system may gather data from many independent departments, each of which has its own vocabulary, format, and policies. While this arrangement may have certain advantages, the lack of central control can lead to discrepancies. For example, when a change is made to one department's vocabulary, the change is not always reflected in the network linking the department to the MLM's, and consequently, a MLM's logic may not work correctly. A related problem occurs when an ancillary database management system changes. Sometimes whole systems stop working either accidentally or for maintenance. The MLMs themselves can be responsible for malfunctions. MLMs are written, maintained, and approved by a number of different persons, and they frequently undergo revision to change the criteria or edit the generated messages. It is easy for an inadvertent revision to cause the MLM's behavior to change in unexpected ways. Changes in care patterns or hospital policy can also cause the MLM to function incorrectly. Finally, malfunctions that have not yet been seen or imagined are likely to arise.

Malfunctions can undermine confidence in the computer-generated messages. Crying wolf once too often can damage credibility to the point that legitimate messages are ignored. It is therefore critical to avoid erroneous messages. Unfortunately, no system is perfect; when malfunctions do occur they must be recognized and fixed as quickly as possible. A malfunction can take the form of an erroneous message (false-positive message) or the more insidious failure to generate a message when it is legitimate (false-negative message).

SUMMARY OF THE INVENTION

An object of the present invention is to present a technique by which malfunctions in computer-generated messages can be automatically detected and warned of.

A further object of the present invention is to detect such malfunctions accurately without generating false warnings.

In order to meet these and other objects which will become apparent with reference to further disclosure set forth below, the present invention provides a method of automatically monitoring a system for the purpose of detecting malfunctions of the system, where the system generates messages based upon selected data, comprising the steps of receiving the messages generated by the system; collecting the messages over statistically significant time periods to form message subgroups consisting of selected numbers of messages; comparing the number of messages in each of the subgroups with predefined limits for that subgroup to determine whether the number of messages in that subgroup is statistically unusual; and generating an alert signal whenever a statistically unusual number of messages is detected.

In a preferred embodiment, the messages are generated by a clinical event monitor comprising a plurality of medical logic modules, with each medical logic module generating a different type of message. In this preferred embodiment, there are a plurality of predefined limits which correspond to the plurality of message types, the collecting step forms message subgroups for each of the plurality of message types, and the comparing step compares the number of messages for each of the subgroups of each message type with the corresponding predefined limits.

It is also preferred that the predefined limits include an upper probability limit and a lower probability limit, where the upper probability limit represents the highest statistically acceptable value for the number of messages, and the lower probability limit represents the lowest statistically acceptable value for the number of messages. An additional step of updating the sample of past message data, from which the predefined limits are formed, based upon the collected messages prior to determining the upper and lower probability limits is likewise preferred.

The present invention also provides an apparatus for automatically monitoring a system for the purpose of detecting malfunctions in the system, where the system generates messages based upon selected data, comprising: input means for receiving the messages generated by the system; storage means, coupled to the input means, for collecting the messages received by the input means over statistically significant time periods to form message subgroups consisting of selected numbers of messages; comparator means, coupled to the storage means, for retrieving the subgroups from the storage means and comparing the number of messages in each of the subgroups with predefined limits to determine whether the number of messages is statistically unusual; and alarm means, coupled to the comparator means, for generating an alert signal whenever a statistically unusual number of messages is detected by the comparing means.

The present invention was designed to detect a broad class of malfunctions: those that cause a change in the number of messages generated by an MLM or other message generating system. If it is determined that a system is generating too many or too few messages based upon its previous activity, then a system administrator is alerted so that the system in be investigated and the credibility of the system can be maintained.

The present invention is a form of a quality control system. In industrial engineering, one judges the quality of a product or process by first selecting some representative property. A statistical distribution either is determined from data or is assumed, and the property is measured. If it falls outside calculated limits the product is investigated or rejected. For the present invention, the quality is the correct functioning of the system (e.g., the clinical event monitor and the MLM's), and the property being measured is the rate of message generation.

However, the present invention differs from traditional quality control in several aspects. In quality control, the limits for the property are usually chosen ahead of time, often by the consumer. The processes are often regular and the limits are usually narrow. For the present invention, the limits are not known ahead of time, and a single system may generate several types of messages, with widely varying limits. The present invention was designed to calculate such limits automatically based on the past history of messages, and to update these limits on a daily basis.

The accompanying drawings, which are incorporated and constitute part of this disclosure, illustrate a preferred embodiment of the invention and serve to explain the principals of the invention.

DESCRIPTION OF THE PREFERRED EMBODIMENTS

Figure 1:
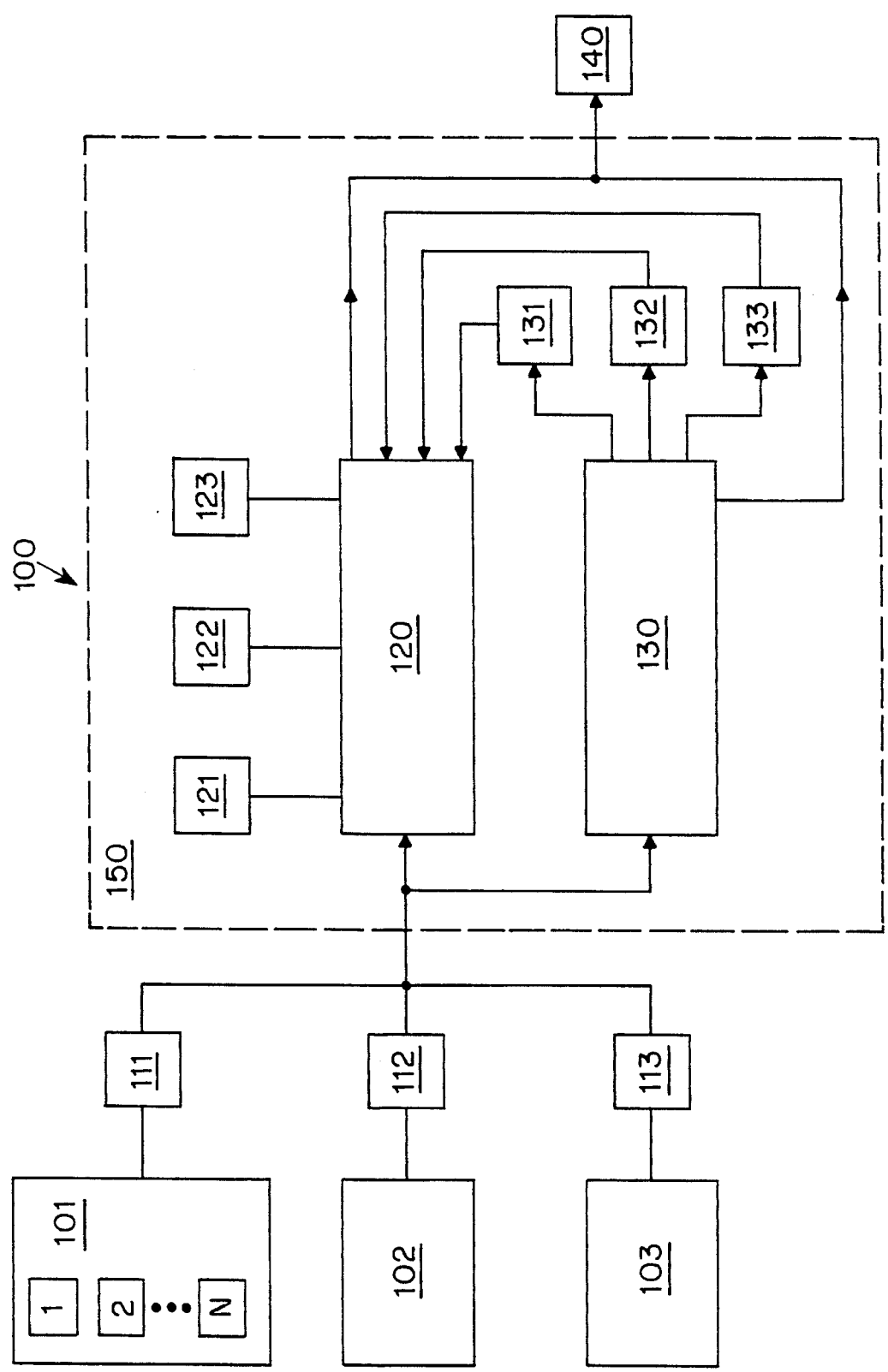
FIG. 1 is a schematic showing an automated statistical tracking device in accordance with the present invention.

Reference will now be made in detail to the present preferred embodiment of the invention as illustrated in the drawings.

FIG. 1 describes an automated statistical tracking device ("AST") designed to detect malfunctions in three separate systems which generate messages. Although the embodiment of FIG. 1 describes an AST tracking three systems, those skilled in the art will appreciate that the number three is selected for convenience and that the present invention can be modified to monitor any number of automated systems.

A Clinical Event Monitor 101, including a plurality of MLM's, 1 ... N, logs messages on log file 111. Log file 111 preferably includes N sub-files, one sub-file for each MLM. Other systems, such as Patient Registration System 102 and Laboratory System 103, similarly log messages on log files 112 and 113, respectively. The log files 111, 112, and 113 store the messages generated by systems 101, 102 and 103, and are available to provide these messages to AST 150 on demand.

AST 150 includes comparator 120, alert records 121, 122 and 123, counter 130, and statistics files 131, 132 and 133. Alert records 121, 122 and 123 contain records of past alerts generated by the AST with respect to systems 101, 102 and 103, respectively. Statistics files 131, 132 and 133 contain records of past message activity for systems 101, 102 and 103, respectively.

In operation, counter 130 is in the form of software implemented on a minicomputer, but could be on a mainframe, minicomputer or personal computer. Counter 130 retrieves the messages for systems 101, 102 and 103 from files 111, 112 and 113 on a periodic, e.g., hourly, basis. The retrieved messages are counted and counted number is added to statistics files 131, 132 and 133, which may include an automatic updating feature so that only the most recent data, e.g., the last 60 days, are included in the stored data sample.

Counter 130 then generates upper and lower probability limits based upon the data stored in statistics files 131, 132 and 133. For example, the upper and lower probability limits that are calculated based on data stored in statistics file 132 establish the highest and lowest statistically acceptable number of messages that could be generated by system 102 within a predetermined time period, e.g., one day. These statistics may also be sent, e.g. by electronic mail, fax machine, etc., to system administrator 140 for manual monitoring. In the case of clinical event monitor 101, which generates several different types of messages corresponding to several different MLM's, upper and lower probability limits are calculated for each message type. The upper and lower probability limits corresponding to the several MLM's may be stored in statistics file 131 which preferably includes N subfiles, one for each MLM.

Comparator 120, also is in the form of software implemented on a minicomputer, and likewise could be on a mainframe, minicomputer or personal computer. Comparator 120 periodically retrieves the message counts for systems 101, 102 and 103 from files 111, 112 and 113. Comparator 120 retrieves the upper and lower probability limits for each type of message from statistics files 131, 132 and 133, and compares the message counts with the probability limits to determine whether the message counts are statistically acceptable. If, for example, the number of messages generated by MLM 2 of Clinical Event Monitor 101 does not fall within the statistical limits generated by counter 130 for MLM 2, comparator means 120 will generate an alert signal that is sent, e.g. by electronic mail, fax, etc. to system administrator 140. In such a case, comparator means 120 will also record the alert in alert record 121.

Note that the log files 111, 112 and 113 contain a log of messages not just from today, but from all past days or from all past days within a predetermined time period, e.g., 60 days. In a preferred embodiment, counter 130 generates statistics from the data stored in the log files, e.g. file 111, rather than re-using the information stored in the statistics files, e.g., file 131.

Likewise, comparator 120 reads data from the log files, e.g., file 111, and compares that data to the limits stored in statistics files, e.g. file 131. It is preferred that such comparison occurs on an hourly basis.

Figure 2:
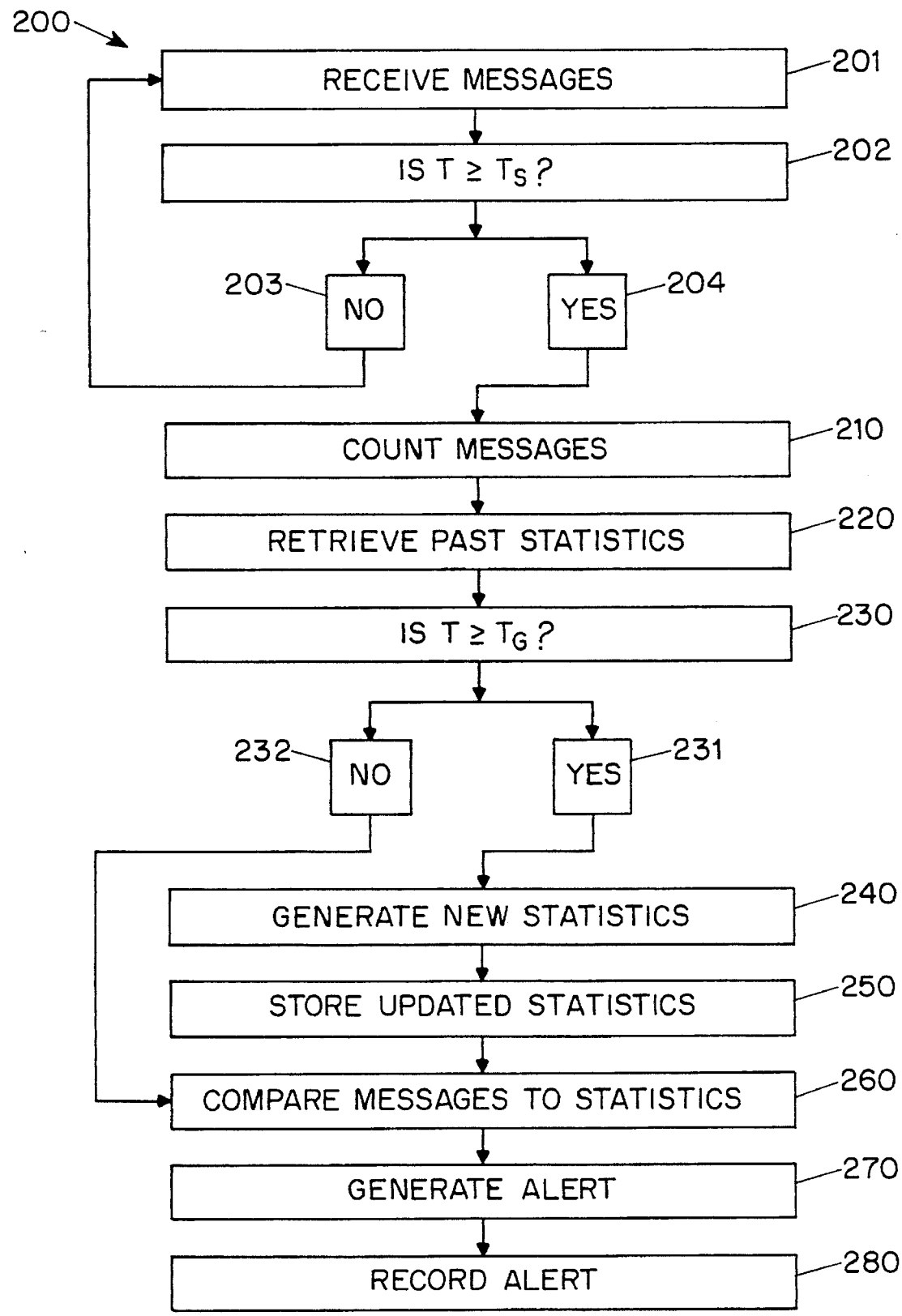
FIG. 2 is a flow chart of an automated statistical tracking method according to the present invention.

A method for automatically statistically tracking a system will now be explained with reference to FIG. 2. Flow-chart 200 presents the basic steps performed by AST 150 to determine whether an alert should be generated because a particular system or message generating component of a system has malfunctioned.

Messages generated by the monitored systems are received by the corresponding external log files 201 whenever they are generated. Let $T_S$ be the statistically significant time period by which message counts will be compared. If the current time period T is less than $T_S$ 202, 203, messages will continue to collect within the external log files. However, when $T \geq T_S$ 204, messages are retrieved and counted 210 so that a determination of whether a malfunction has occurred can be made.

Next, past statistics 220 for the system are retrieved. Let $T_G$ be a preselected time period chosen for updating past message data. $T_G$ may be equal to $T_S$ or may be any other preselected value; in the preferred embodiment, while $T_S$ is one hour, $T_G$ is set at one day. For whichever preselected value of $T_G$, when $T \geq T_G$ 230, 231 new statistics based on the newly retrieved and counted messages are generated 240 and stored 250 for future use. The updated statistics preferably include both upper and lower probability limits. The number of new messages is then compared with the probability limits 260 to determine whether the number of new messages is statistically acceptable. Alternatively, if T is less than $T_G$ 232, new statistics are not generated and the comparison step 260 is directly proceeded to. Finally, if the number is not statistically acceptable, an alert is generated 270 and recorded 280.

There are many approaches to picking upper and lower limits on the number of messages that a system or an MLM is expected to generate per day. The Poisson and normal distributions were chosen for the AST because they are well known, easily implemented, and carry a clear interpretation of their result. For example, they can provide not just a binary answer that today's rate is or is not atypical, but in addition a quantitative measure of how atypical, expressed as a probability. The sensitivity of the system can be adjusted by setting a threshold for alerting a system administrator. It should be recognized that other methods are available to determine the upper and lower limits, e.g. internal consistency studies, nonparametric methods, neural networks, or various outlier algorithms.

For the Poisson distribution, the approach is to find the minimum message count such that all counts less than or equal to it account for at least $1-\alpha$ of the probability, $$1 - \alpha \leq \Sigma_{k+1\ldots K} \frac{e^{-m_h} m_h^k}{k!} . \qquad (1)$$

The smallest value of K that satisfies Eq. (1) for k=0, 1, . . . , K is the Poisson upper limit. Any message count greater than K is considered unusual. Although a similar analysis can be done for the lower limit, the Poisson lower limit is not that useful, because if the mean message rate is low, the lower limit is zero, while if the mean message rate is high, then the normal distribution provides a better approximation.

A set of random events will follow a Poisson distribution if: (a) the events are independent of each other; (b) the probability of an event is proportional to the length of the interval; (c) an infinite number of events could occur in an interval, and (d) in any infinitesimally small interval, the probability of more than one event is negligible. The generation of MLM messages approximates a Poisson distribution. MLM messages are not completely independent because the events that trigger the MLMs are not independent. For example, someone who has been admitted to the hospital is likely to be discharged; someone who has one serum electrolyte test is likely to have a second measurement soon after. Each of these events have their own MLM's. Despite the dependencies among the triggering medical events, the MLM messages appear relatively independent to the AST for three reasons. First, MLM messages are analyzed separately for each MLM, so any dependence between messages of different MLMs does not affect the system. Second, each MLM tends to be triggered by only one medical event, so even though one medical event is correlated with another type of event, the MLM messages are not affected. Third, most MLMs contain logic to avoid sending duplicate alerts to the same patient. Even if one medical event causes a second medical event of the same type, a second message will not be generated for most MLMS. The second Poisson assumption (b) is broken only by MLMs whose message generation varies widely with the day of the week (or holiday). The third and fourth Poisson assumptions are well approximated by the MLM message generation process.

Whereas the Poisson distribution is characterized by a single parameter (mean event rate), the normal distribution is characterized by a mean and a standard deviation. For each MLM, the mean message count (m) and standard deviation of the message counts (s) are calculated from the N most recent daily message counts, where N is between 7 and 60 inclusive. To avoid the singularities that occur when m or s is zero, they are not allowed to fall below the following minima:

$$m_{min} = \frac{1}{2N} \quad (2)$$

$$s_{min} = m^{1/2} \quad (3)$$

The normal distribution with Student's t statistic provides the best estimate of the upper and lower limits because the AST has access only to the sample standard deviation for each MLM. The problem is a special case of comparing the means of two samples whose underlying standard deviations are the same but not known. The first sample is the log of MLM message counts with a sample size N, and the second sample is the current message count with a sample size of 1. Given a probability threshold ($\alpha$), the upper and lower limits beyond which at message count would have a probability of occurring by chance alone less than $\alpha$ are given:

$$l_u = int(0.5 + m + st(1 + 1/N)^{1/2}), \quad (4)$$

$$l_l = int(0.5 + m - st(1 + 1/N)^{1/2}), \quad (5)$$

where $l_u$ is the upper limit, $l_l$ is the lower limit, t is the Student t statistic, and int returns the largest integer less than or equal to its argument. These equations are derived from the formula for the t statistic, the formula for pooled sample variance, and a continuity correction. The following approximation is used for t, $$t = \frac{1}{-0.0953 + -0.631/(1+df) + 0.81/(-\ln(4\alpha(1-\alpha)))^{1/2} + 0.076 \ (2\alpha((2\pi)^{1/2}-0.5)df^{1/2})^{1/df}} \quad (6)$$

where df, the degrees of freedom, equals N−1. A detailed explanation of this approximation may be found in N. Thomson, "APL Programs for the Mathematics Classroom." Springer-Verlag, New York, 1989, which is incorporated by reference herein. Since the message count can be too high or too low, a two-tailed analysis is desired, and $\alpha/2$ is used instead of a. For example, if one wants to call message counts unusual when there is a probability less than 0.001, then one would use $\alpha=0.0005$ in Eq. [6].

As an alternative to the t statistic, it can be assumed that the sample mean and standard deviation equal the underlying mean and standard deviation. In such a case, the simpler z statistic, which does not depend on the number of degrees of freedom, can be used. The z statistic approximation is also described in the Thomson reference. With the z statistic, $$l_u = int(0.5 + m + SZ), \quad (7)$$

$$l_l = int(0.5 + m - SZ). \quad (8)$$

The z statistic is approximated by:

$$z = g - \frac{2.515517 + 0.802853 \ g + 0.010328 \ g^2}{1 + 1.432788 \ g + 0.189269 \ g^2 + 0.001308 \ g^3}, \quad (9)$$

where $$g = (\ln \alpha^{-2})^{1/2}. \quad (10)$$

The normal distribution is continuous, unbounded, and symmetric. MLM message counts (number of messages generated on a particular day for an MLM) are discrete, nonnegative, and asymmetric. Nevertheless, the normal distribution can provide a useful approximation under the right conditions. For MLMs with a low mean message rate, the assumptions of a normal distribution are severely broken —the message counts take on a few discrete values and the distribution is very asymmetric—and the Poisson distribution would likely fit the data better. When the mean message rate is high enough, a Poisson distribution can be approximated by a normal distribution whose standard deviation is the square root of the mean.

We can exploit the fact that the normal distribution has two parameters that can be tailored to each MLM. By using a standard deviation that is not equal to the square root of the mean, MLMs that are not fit by a Poisson distribution may be fit very well. For example, by increasing the standard deviation, the normal distribution can account for MLMs that send messages in pairs; such a dependency breaks one of the Poisson assumptions. Since the normal distribution not only can mimic the Poisson distribution but also can be further tailored to individual MLMS, then at high means, MLMs are likely to be better fit by the normal distribution than the Poisson distribution.

Figure 3A:
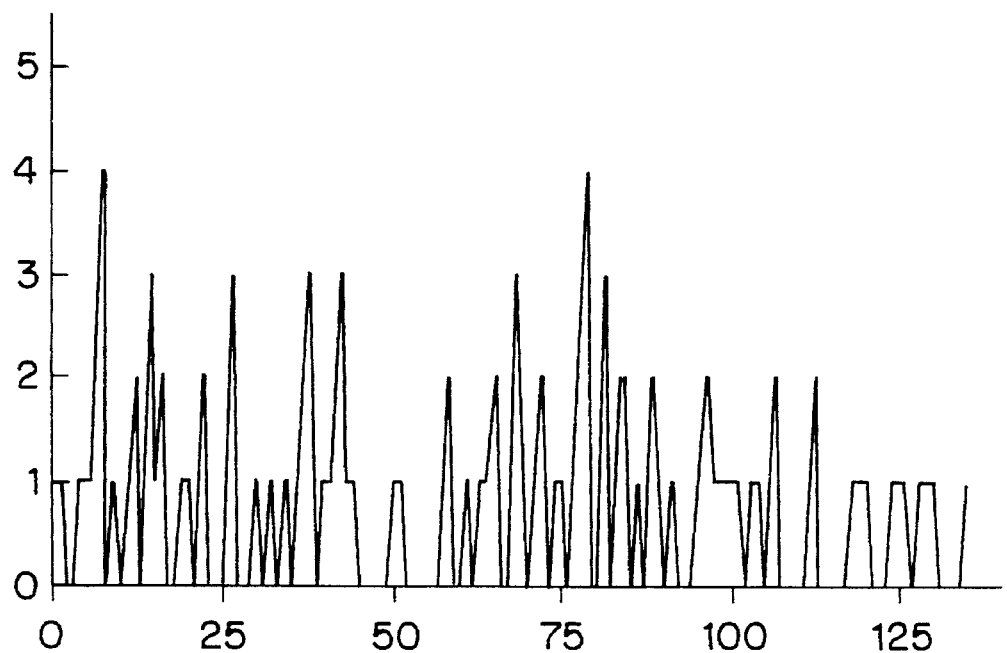
FIGS. 3a, 3b and 3c are graphs showing message count vs. time for thee different MLM's.
Figure 3B:
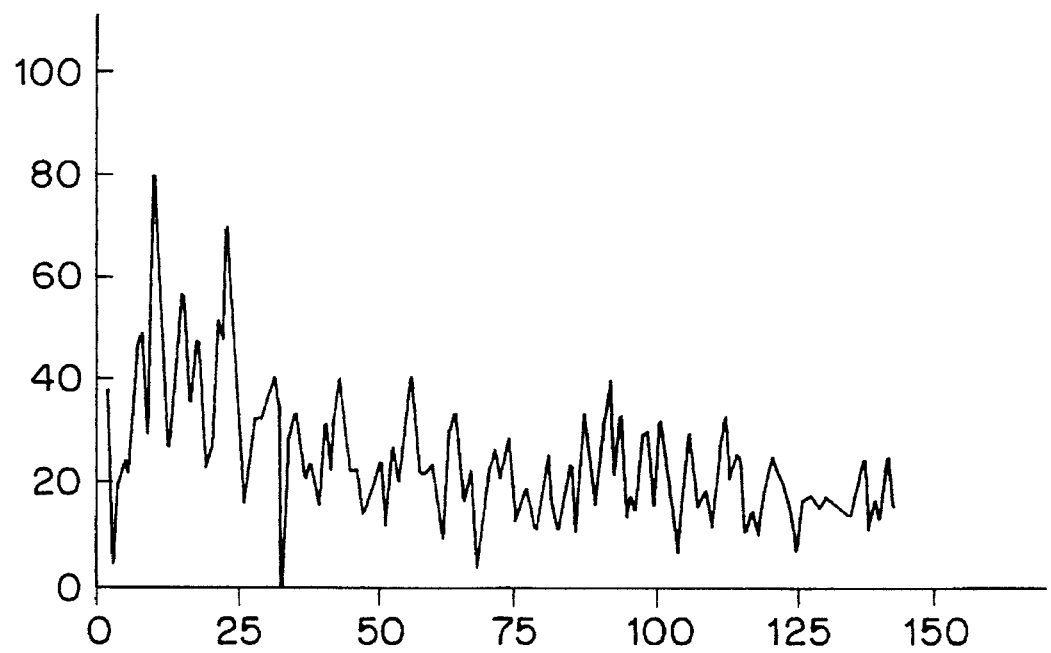
Figure 3C:
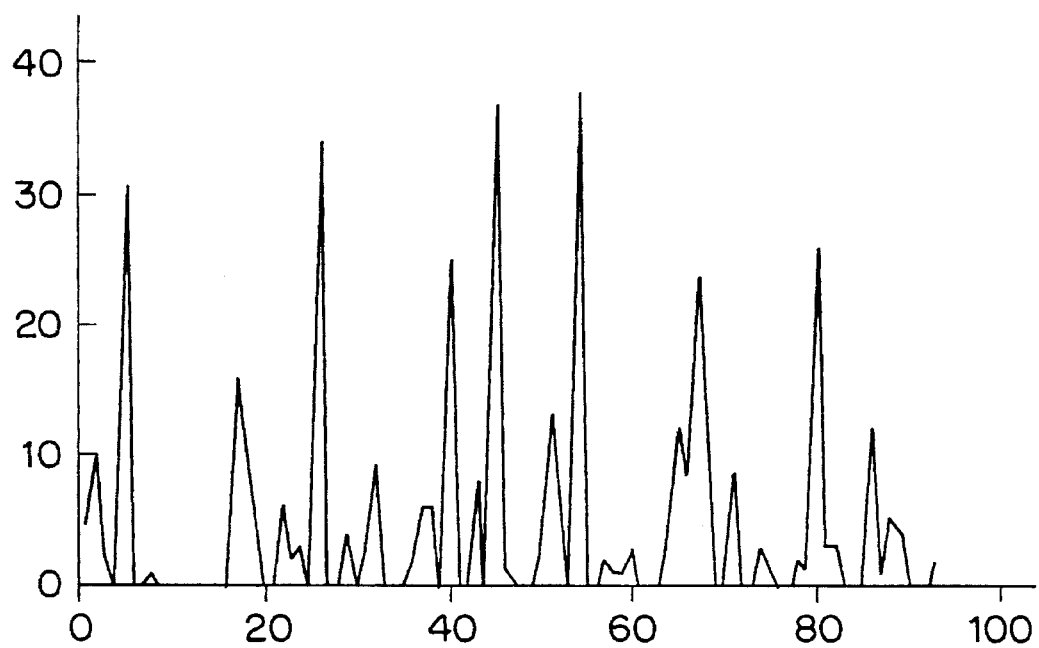

FIGS. 3a, 3b and 3c show how the message count varied over time for three MLMS. Each graph shows the number of messages generated per day (y-axis) by an MLM over time (x-axis). FIG. 3a shows data for the MLM Digoxin and hypokalemia, which warns of possible heart problems when a patient is taking the medication Digoxin and has a low potassium level in his or her blood. FIGS. 3b shows data for the MLM renal insufficiency, which warns of a kidney condition based on a blood test. FIG. 3c shows data for the MLM "mrnchng", which warns of medical record number changes, and thus is an administrative MLM. FIGS. 3a–3c are a graphical view of what is stored in the log file 111. This type of data is used to generate the limits stored in statistics file 131.

Figure 4A:
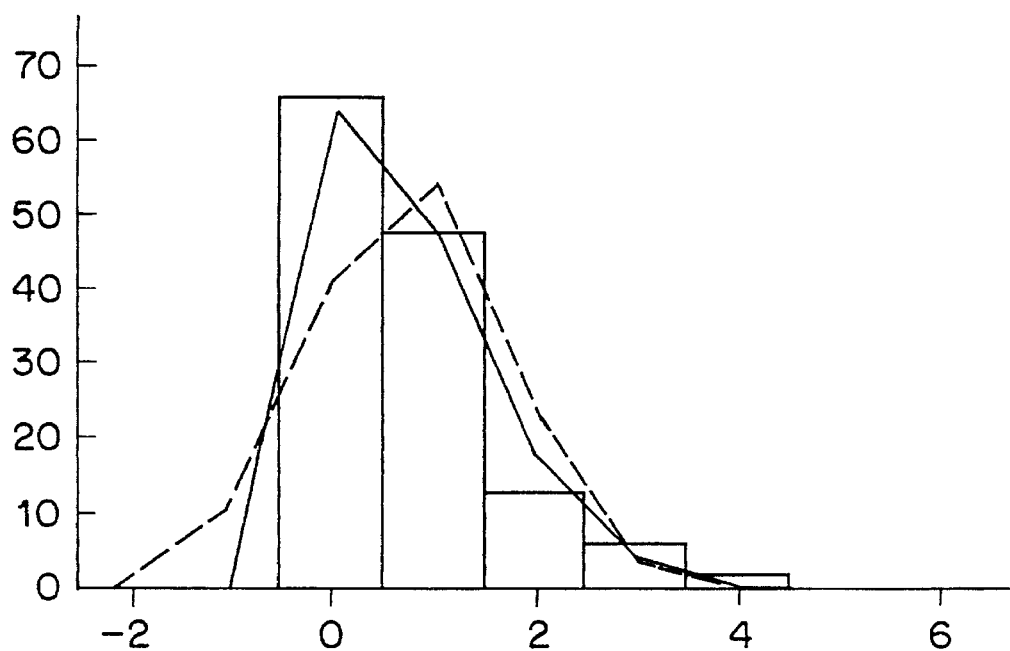
FIGS. 4a, 4b and 4c are graphs showing the number of days vs. message count for three different MLM's, together with the expected Poisson and Normal distributions for the graphs.
Figure 4B:
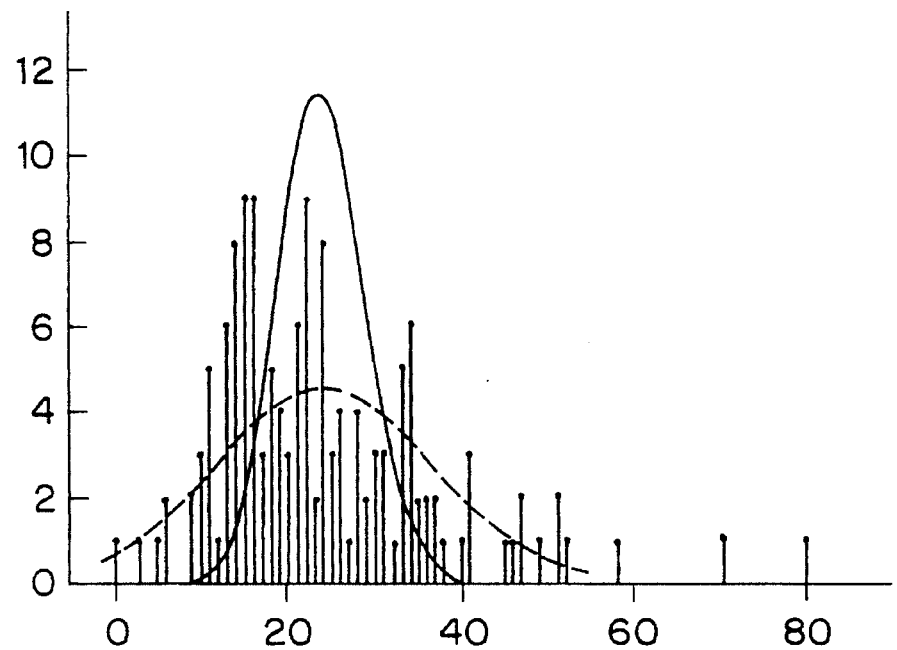
Figure 4C:
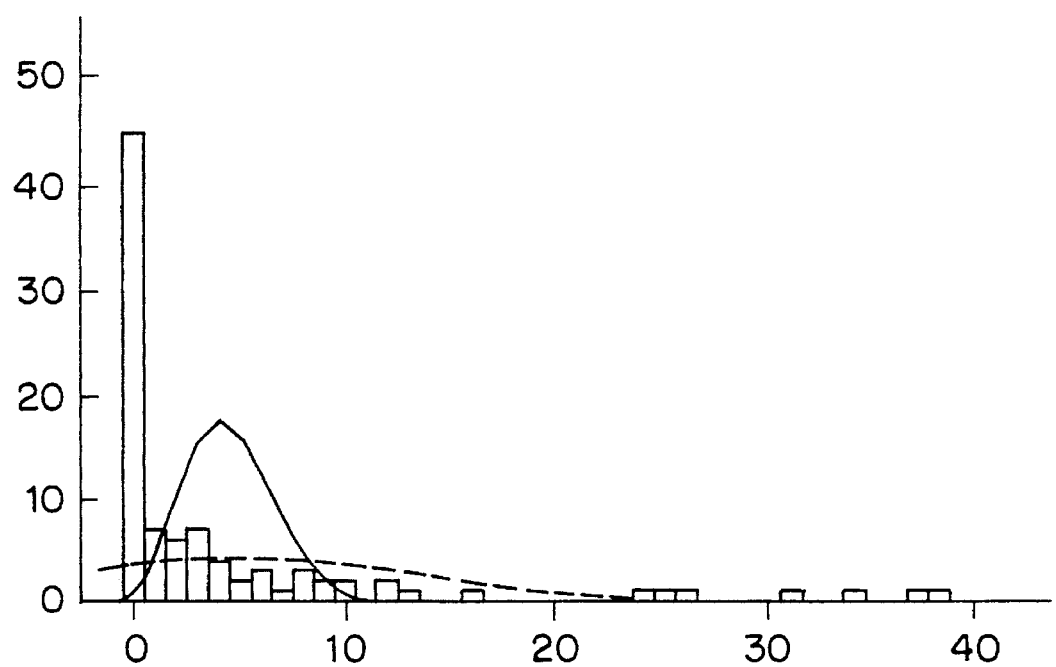

FIGS. 4a, 4b and 4c show the distributions of the message counts for the same three MLMS. Each histogram shows the number of days (y-axis) that in MLM had a given message count (x-axis) during the study period. Superimposed on the histogram are the Poisson and normal approximations to the message distribution. The solid line represents the expected number of times a given message count should appear assuming that the MLM messages follow a Poisson distribution. The dashed line represents the expected number of times a given message count should appear assuming that the message counts are drawn from a normal distribution. It was found empirically that about one-third of MLMs have a mean message rate that is less than three, e.g., FIG. 4a, and they follow a Poisson distribution fairly well. The normal distribution provides a better approximation for MLMS with higher mean message rates, e.g., FIG. 4b. About one-third of MLMs have a disproportionate number of days with message counts of zero, usually due to the MLM not sending messages on weekends, or a disproportionately long tail toward higher message counts, e.g., FIG. 4c. While the normal approximation for these MLMs is not perfect, a perfect fit is not required to generate reasonable limits.

To implement the basic algorithm, the mean message rate and the standard deviation of the message counts are calculated for each MLM from a log that records how many messages each MLM generated each day in the past. These parameters are used to derive the Poisson and normal approximations to the MLM message count distributions, such is those shown in FIGS. 4a–4c. Given today's message count and the estimated distribution, the probability that the message count would occur by chance alone is calculated. If the probability of getting such a message count is less than some preset threshold, then the message count is considered "unusual" and an electronic mail message is sent to the system administrator who can investigate whether there has been a malfunction. To improve execution efficiency, the AST does not actually calculate the probability of each message count, but instead calculates upper and lower limits daily, and the message counts are compared to the limits over the course of a day.

Since neither the Poisson nor the normal distribution fits all MLMs exactly, a third algorithm, which uses both the Poisson and the normal distributions, was designed. It considers a message count to be unusual only if both distributions consider it to be unusual. The two algorithms can be combined by using the minimum or maximum of the limits that each generates. For an upper limit, the maximum function results in an algorithm that is less sensitive and more specific, whereas for a lower limit, the maximum function results in a less strict algorithm. By combining algorithms in this manner, better upper limits and better lower limits are produced.

The algorithms described above assess only the current message count. Some malfunctions cause a message count that is not unusual by itself, but is unusual if it is repeated over several days. The main example of this is when an MLM stops sending messages. A single day with no messages is not unusual for most MLMs, but a string of days with no messages may be due to a malfunction. Therefore, an additional algorithm, called the "consecutive zero algorithm," was included.

The consecutive zero algorithm exploits the binomial distribution where the binary variable is the presence or absence of messages on a given day. It assumes that most malfunctions meant to be detected by the lower limit will reduce the message count to zero, and that the algorithm must look over several days to detect a significant drop in messages. Besides the mean message rate and standard deviation, the log of message counts is characterized by the proportion of days in the log that had zero messages ($P_z$). Then, in addition to the current message count analysis, the AST checks how many consecutive days, including the current one, have had zero messages ($N_z$). The probability (p) of seeing such a stretch of days with no messages is simply $$p = p_z^{N_z}, \qquad (11)$$

If p is less than the probability threshold ($\alpha$), then the AST generates an alert. The proportion $P_z$ is calculated without including the most recent $N_z$, days with zero messages, so that the potential malfunction days do not bias $p_z$. In order to make the output consistent with the other algorithms, the lower limit is defined as $$l_1 = \begin{cases} 1 & \text{if } P < \alpha, \\ 0 & \text{if } P \geq = \alpha. \end{cases} \qquad (12)$$

Preferably, when the mean message rate and the standard deviation of the message counts are calculated, only data from the most recent 60 days are used. This improves execution efficiency by limiting the amount of data that must be processed, and it allows the AST to judge the current message count based upon recent data. The AST could be modified by adding a new facility so that it tracks not just messages per day, but also slow trends in the mean message rate. When there are fewer than 7 days worth of data, the AST should not calculate any limits because of the small sample size and high potential rate of false-positive AST alerts.

The clinical event monitor is designed to run on mainframe computer. Whenever an MLM generates a message, the event monitor places a record on a queue, and the record is transferred to the AST, which may be implemented in any programming language on any computer, for example, I use a Unix workstation with Unix Korn Shell scripts using the Unix utilities awk, sort, comm, uniq, and sendmail. On a periodic basis, statistics are generated from the history of MLM messages, and the AST's upper and lower limits are determined based upon the statistical distribution and the preset probability threshold. In addition to these automated limits, a system administrator can always add manual limits for each MLM. The AST may be programmed to check the current message count for each MLM every hour. If, during the course of the day, a message count exceeds its upper limit, or if, at the end of the day, a message count exceeds either the upper or the lower limit, then an AST alert is sent via electronic mail to the system administrator. Once an alert is generated for an MLM, no other alerts should be permitted on the same day for the same MLM. In addition to the alerts, the daily statistics and limits may be assembled into a report and mailed to the system administrator for manual review.

EXAMPLE 1

Retrospective Comparison

The ability of the AST to detect malfunctions was tested on a retrospective data set, which consisted of the Clinical Event Monitor transactions that had been logged from 9 Jul. 1991 to 31 May 1992. Of the 38 MLMs that had been used during that period, 12 MLMs ran for at least 80 days and were included in the analysis. Several different variations of the algorithms outlined above are compared, and several values for the preset probability threshold are compared.

Three methods were used to find the malfunctions that the AST ought to detect. First, a log of all known malfunctions was kept by the system administrator while the messages were being produced. Second, the text of all MLM messages was reviewed manually for evidence of system malfunction. Third, graphs of message counts were reviewed; counts that appeared very high or very low and long stretches of days with no messages were assessed for the possibility of malfunction. Counts were considered malfunctions if a definite problem could be identified in an MLM, the clinical event monitor, or any of the supporting systems. If a malfunction lasted several days, it was counted as one malfunction. The rebound increase in messages that can follow system downtime was counted as a malfunction, because if the downtime was missed, it was desirable that the AST at least detect the rebound.

The AST is able to use different algorithms to calculate its upper and lower limits; the limits were therefore analyzed separately. The following upper-limit algorithms were compared: the Poisson distribution, the normal distribution using the t statistic, the normal distribution using the z statistic, and several combination algorithms that were created by taking the maximum of two upper limits. A heuristic algorithm that detected all points that were far from the rest of the points was also compared; it considered any point that was more than two interquartile ranges from the upper quartile unusual. The following lower-limit algorithms were compared: the Poisson distribution, the normal distribution using the t statistic, the normal distribution using the z statistic, the consecutive zero algorithm, and combination algorithms that were created by taking the maximum of two lower limits.

The known malfunctions were divided into two groups; the high malfunctions had counts greater than the mean for the MLM and the low malfunctions had counts less than the mean. For each day the message count was compared to the upper limit calculated for that day. If the count represented a high malfunction and it was greater than the limit, it was called a true positive "TP" which is an appropriate AST alert. A high malfunction that was not greater than the upper limit was called a false negative "FN," which is a missed malfunction. All other counts were called false positive "FP," which are inappropriate AST alerts if greater than the upper limit and true negative "TN" otherwise. The lower limit was assessed similarly. Multiday malfunctions were considered TP if any of their days broke a limit.

The following objective was used to judge the performance of the algorithms. The AST was to detect as many malfunctions as possible while keeping the false positive rate FP/(FP+TN) below 0.01 erroneous alerts per MLM-day. The latter was chosen as a practical limit based upon the size of existing systems, which can have thousands of rules. Even this limit would generate tens of false-positive alerts per day for systems that big.

There were seven malfunctions in total. Four were "high malfunctions" (the count was greater than usual for the MLM), and three were "low malfunctions" (the count was less than usual). The causes included MLM errors (two), a change in a departmental vocabulary (one), and departmental system downtime (four). Table 1 shows the performance of the AST in detecting high malfunctions with its calculated upper limits. The probability thresholds that were used for the algorithms are shown in parentheses. Table 2 shows the performance of the AST in detecting low malfunctions with its calculated lower limits.

TABLE 1

COMPARISON OF ALGORITHMS FOR UPPER LIMITS

| Algorithm | TP | FN | FP | TN |
|---|---|---|---|---|
| Poisson(0.003) | 4 | 0 | 37 | 1520 |
| Normal with t statistic(0.003) | 2 | 2 | 18 | 1539 |
| Normal with z statistic(0.003) | 2 | 2 | 25 | 1532 |
| max{Poisson(0.003), z statistic(0.003)} | 2 | 2 | 17 | 1540 |
| max{Poisson(0.001), z statistic(0.001)} | 2 | 2 | 10 | 1547 |
| max{Poisson(0.0001), z statistic(0.0001)} | 2 | 2 | 6 | 1551 |
| Outlier algorithm | 2 | 2 | 236 | 1321 |

TABLE 2

COMPARISON OF ALGORITHMS FOR LOWER LIMITS

| Algorithm | TP | FN | FP | TN |
|---|---|---|---|---|
| Poisson(0.003) | 0 | 3 | 18 | 1540 |
| Normal with t statistic(0.003) | 0 | 3 | 0 | 1558 |
| Normal with z statistic(0.003) | 0 | 3 | 0 | 1558 |
| Consecutive zero(0.003) | 3 | 0 | 0 | 1558 |
| max{consecutive zero(0.003), z statistic(0.003)} | 3 | 0 | 0 | 1558 |
| max{consecutive zero(0.001), z statistic(0.001)} | 3 | 0 | 0 | 1558 |
| max{consecutive zero(0.0001), z statistic(0.0001)} | 2 | 1 | 0 | 1558 |

In the upper-limit analysis (Table 1), the Poisson algorithm was the most sensitive, and the combination algorithms were the most specific. Although the Poisson algorithm caught all four TPs, the false-positive rate of 0.024 was too high. The two malfunctions missed by the combination algorithms were from the same MLM. The malfunctions were associated with message counts of 10 and 11, but these were preceded by nonmalfunction message counts as high as 15 in the MLM. These malfunctions are very difficult to detect by message counts alone. Upon reviewing Table 1, it was decided to use a combination algorithm. While the Poisson algorithm can be combined with either of the two normal distribution algorithms, the z statistic was chosen for the AST because it is significantly easier to implement, as the degrees of freedom are not needed. Subsequent review has revealed that the z statistic can consistently duplicate the t statistic's performance by using a slightly higher probability threshold.

In the lower-limit analysis (Table 2), only the algorithms that included the consecutive zero algorithm performed well at all. The reason for this was that none of the low malfunctions were unusual for their MLM on the first day; it was only the run of zero messages that was unusual. Although the combination algorithms did not perform better than the consecutive zero algorithm by itself, it was decided that they were preferable because they might someday pick up a malfunction that was low but still above zero.

A single probability threshold was chosen for both the upper and lower limits. Upon reviewing Table 1 and Table 2, a value of 0.001 was selected. With this threshold, the selected algorithms would have detected five out of seven malfunctions with only 10 FPs (false-positive rate of 0.006).

EXAMPLE 2

Prospective Evaluation

A prospective evaluation of the AST's performance was also carried out. The study began 8 Jun. 1992 and ended 31 Aug. 1992, which is an 85-day period. All MLMs used for clinical care or research were included. Malfunctions were detected by the same methods as in the retrospective study with the addition of comments from users via electronic mail. Redundant alerts due to the same malfunction were counted as a single TP alert, and strings of several low-message-count alerts in a row on the same MLM were counted as a single alert, TP or FP.

The AST's performance was compared to the human ability to detect significant changes in message counts. This is important since the expected malfunction rate is so low that it is difficult to judge the AST's performance based on real malfunctions alone. Graphs similar to those in FIG. 3 were generated for each MLM that was studied. The number of messages per day was plotted for every day that the MLM was active within the period from 60 days before 8 Jun. 1992 to 31 Aug. 1992. Five subjects who had experience in medical informatics but who had no knowledge of how the AST worked were instructed to pick out the days for each MLM that they felt ought to be investigated for possible malfunction. They were told that systemic malfunctions occurred about once per month, that a malfunction might affect more that one MLM, and that missing a malfunction (FN) cost the same as three inappropriate alerts (FPs). The latter was chosen so that their threshold would approximate those of the algorithms in the retrospective study. Their performance was compared to those of the AST.

Within the 85-day period, there were 12 MLMs in production use for a total of 910 MLM-days; they generated a total of 9052 messages during that period. Two malfunctions occurred. The first malfunction was initially detected by the AST itself. The involved MLMs were triggered by the transfer of diagnosis codes from the diagnosis coding system to the hospital's financial system. Because of a bug, the data might or might not be available in the financial system in time for the MLMs to query it. The second malfunction occurred when the link between the mainframe computer where the clinical event monitor runs and the Unix computer that routes electronic mail was broken; researchers did not receive their messages for more than a day. The malfunction was discovered by the system administrator during manual review of the AST's daily statistics, which showed no messages for the day.

The AST generated one TP alert and eight FP alerts. The TP alert was a "high alert", where the message count exceeded the upper limit. Of the FP alerts, five were FP high alerts and three were FP "low alerts" where the message count was below the lower limit. The false-positive rate was 0.009.

Table 3 compares the overall performance of the AST to the live human subjects; subjects are numbered from best (Subject 1) to worst (Subject 5) performance, assigning greater cost to FNs than FPs. The first malfunction was detected by the AST and by Subjects 1, 2, and 3. The AST detected the first malfunction 11 days before any of the subjects. The second malfunction was detected only by Subject 1. Of the AST's 8 FP alerts, 1 was chosen by none of the subjects, 4 were chosen by one subject, and 3 were chosen by two or three subjects. Of the 24 unique FP alerts chosen by the subjects, 15 were chosen by only one subject, 8 were chosen by two or three subjects, and 1 was chosen by all five subjects.

TABLE 3

PERFORMANCE ON PROSPECTIVE DATA

| Subject | TP | FN | FP | TN |
| --- | --- | --- | --- | --- |
| AST | 1 | 1 | 8 | 900 |
| Subject 1 | 2 | 0 | 8 | 900 |
| Subject 2 | 1 | 1 | 4 | 904 |
| Subject 3 | 1 | 1 | 17 | 891 |
| Subject 4 | 0 | 2 | 4 | 904 |
| Subject 5 | 0 | 2 | 4 | 904 |

The AST proved to be useful in the prospective evaluation. Of the two malfunctions that affected the clinical event monitor during the 85-day study period, the AST detected the first one automatically. The messages generated by the affected MLMs are sent to other automated systems and are not normally under human review. Therefore, had it not been for the AST, this malfunction would probably have gone undetected for some time.

The AST missed the second malfunction, which shut off all messages to the AST. It did not produce an alert because a single day with no messages was not unusual for any of the MLMs in the system. Had the malfunction lasted another day, the AST would have generated an alert since it would have been unusual for one of the MLMs to have no messages for 2 days straight. It was unusual for all the MLMs as a group to have no messages on the same day, and this was noted by the system administrator upon review of the AST's daily report.

The AST's 0.009 false-positive rate was certainly not overwhelming to the system administrator. Given a probability threshold of 0.001, one might expect to see only one FP in the 910 MLM-days. This is an order of magnitude lower than the number actually produced by the AST. The difference is probably due to a number of factors. The MLM messages do not follow a truly Poisson or normal distribution. MLMs whose messages occur in clusters break the Poisson independence assumptions severely; of these MLMs, those that have low mean message rates do not fit the normal distribution well either. MLMs with message counts that vary significantly with the day of the week or holidays are also less likely to fit the distributions. If sample size is large enough, an algorithm that analyzes each day of the week separately may be considered.

The use of an automated system, based largely upon classical statistics, to detect malfunctions in a clinical event monitor or other message generating system has been described. Its performance is similar to that of human subjects, but since it is in automated system, it can monitor the generation of messages in real time. The AST can detect malfunctions that might not otherwise be detected, yet is straightforward to implement, and requires few resources.

Although the particular embodiment described above is a simple system, the AST has equal applicability to larger and more complex systems. The AST would likely be helpful for a large system even with the current probability threshold; a system that generates 10 alerts per day is welcome when the alternative is reviewing the activity of 1000 MLMS. By reporting not just the fact that a limit was broken, but also the p value of the message count, the system administrator might be able to prioritize the alerts. The system administrator could check whether the MLM has been edited recently, review recent MLM messages, check whether related MLMs are still functioning, and possibly check whether a departmental system is operating.

The computer and human resources needed to run the AST are minimal. Since the event monitor runs on a separate mainframe computer, and since the transfer of the MLM record from the event monitor to the AST requires minimal processing, the AST cannot bog down a clinical event monitor. On the AST's workstation, the hourly message count processing takes less than a minute, and the daily statistics generation takes 1.5 min. Potentially, 60 min are available for each of these functions. Most of the execution time is spent processing the message log, which contains a record for every single MLM message. By aggregating the log to counts per day, its size would shrink by a factor of 25. Furthermore, by replacing Unix shell scripts with C routines, speed could be further improved. The AST should have no problem handling messages from thousands of MLMs. Other than tracking down alerts, the time required to maintain the AST should be minimal.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

I claim:

1. A method for automatically monitoring a system to detect malfunctions, wherein said system generates messages based upon selected data, comprising the steps of:

(a) receiving messages generated by said system;

(b) counting said messages over statistically significant time periods to form message subgroups including selected numbers of messages;

(c) comparing the number of messages in each of said subgroups with predefined limits for that subgroup to determine whether said number of messages in that subgroup is statistically unusual; and (d) generating an alert signal whenever a statistically unusual number of messages is detected.

2. The method of claim 1, wherein:

(a) said messages generated by said system are of a plurality of types, predefined limits being established for each of said message types;

(b) said counting step comprises forming message subgroups for each of said plurality of message types, and (c) said comparing step comprises comparing the number of messages in each of said subgroups of each message type with said corresponding predefined limits.

3. The method of claim 2, wherein said system is a clinical event monitor comprising a plurality of medical logic modules, each of said plurality of medical logic modules generating a different one of said plurality of types of messages.

4. The method of claim 3, wherein said statistically significant time periods each consist of one day.

5. The method of claim 1, wherein said predefined limits include an upper probability limit and a lower probability limit.

6. The method of claim 5, wherein said upper probability limit represents the highest statistically acceptable value for said number of messages, and said lower probability limit represents the lowest statistically acceptable value for said number of messages.

7. The method of claim 6, wherein said upper probability limit and said lower probability limit are derived from a statistically significant sample of past message data.

8. The method of claim 7, further including the steps of:

(e) retrieving said sample of past message data from storage; and (f) generating said upper and said lower probability limits from said retrieved sample of past message data prior to step (c).

9. The method of claim 8, wherein said upper probability limit is determined from an algorithm based on poisson and normal distributions applied to said sample of past message data.

10. The method of claim 9, wherein said poisson distribution has a single probability threshold of 0.001, said normal distribution is based on the z statistic with a single probability threshold of 0.001, and said upper algorithm is based on a maximum value determined from said poisson and normal distributions.

11. The method of claim 8, wherein said lower probability limit is determined from an algorithm based on a normal distribution and a binomial distribution applied to said sample of past message data.

12. The method of claim 11, wherein said binomial distribution comprises the consecutive zero algorithm.

13. The method of claim 12, wherein said normal distribution is based on the z statistic with a single probability threshold of 0.001, said consecutive zero algorithm has a single probability threshold of 0.001, and said lower algorithm is based on a maximum value determined from said normal distribution and said consecutive zero algorithm.

14. The method of claim 8, further including the step of updating said stored sample of past message data based upon said messages collected in step (b).

15. The method of claim 14, wherein said statistically significant time period is one day, and said past message data comprises data from a preselected number of days.

16. The method of claim 8, wherein said statistically unusual number of messages is detected whenever said number of messages is greater than said upper probability limit or is less than said lower probability limit.

17. The method of claim 16, wherein said alert signal generated in step (d) is electronic mail sent to a system administrator.

18. Apparatus for automatically monitoring a system to detecting malfunctions, wherein said system generates messages based upon selected data, comprising:

(a) input means for receiving messages generated by said system;

(b) counting means, coupled to said input means, for collecting said messages received by said input means over statistically significant time periods to form message subgroups including selected numbers of messages;

(c) comparator means, coupled to said counting means, for receiving the subgroups from said counting means and comparing said number of messages in each of said subgroups with predefined limits for that subgroup to determine whether said number of messages in that subgroup is statistically unusual;

(d) alarm means, coupled to said comparator means, for generating an alert signal whenever a statistically unusual number of messages is detected by said comparator means.

19. The apparatus of claim 18, wherein:

(a) said messages generated by said system are of a plurality of types, predefined limits being established for each of said message types;

(b) said counting means forms message subgroups for each of said plurality of message types, and (c) said comparator means compares the number of messages in each of said subgroups of each message type with said corresponding predefined limits.

20. The apparatus of claim 19, wherein said system is a clinical event monitor comprising a plurality of medical logic modules, each of said plurality of medical logic modules generating a different one of said plurality of types of messages.

21. The apparatus of claim 20, wherein said statistically significant time periods each consist of one day.

22. The apparatus of claim 18, wherein said predefined limits include an upper probability limit and a lower probability limit.

23. The apparatus of claim 22, wherein said upper probability limit represents the highest statistically acceptable value for said number of messages, and said lower probability limit represents the lowest statistically acceptable value for said number of messages.

24. The apparatus of claim 23, wherein said upper probability limit and said lower probability limit are derived from a statistically significant sample of past message data.

25. The apparatus of claim 24, further including:

(a) limit generating means, coupled to said comparator means, for generating said upper and said lower probability limits from said sample of past message data;

(b) data storage means, coupled to said limit generating means, for storing said sample of past message data, said limit generating means retrieving said sample of past message data from said data storage means prior to generating said probability limits.

26. The apparatus of claim 25, wherein said upper probability limit is determined from an algorithm based on poisson and normal distributions applied to said sample of past message data.

27. The apparatus of claim 26, wherein said poisson distribution has a single probability threshold of 0.001, said normal distribution is based on the z statistic with a single probability threshold of 0.001, and said upper algorithm is based on a maximum value determined from said poisson and normal distributions.

28. The apparatus of claim 25, wherein said lower probability limit is determined from an algorithm based on a normal distribution and a binomial distribution applied to said sample of past message data.

29. The apparatus of claim 28, wherein said binomial distribution comprises the consecutive zero algorithm.

30. The apparatus of claim 29, wherein said normal distribution is based on the z statistic with a single probability threshold of 0.001, said consecutive zero algorithm has a single probability threshold of 0.001, and said lower algorithm is based on a maximum value determined from said normal distribution and said consecutive zero algorithm.

31. The apparatus of claim 25, further including data updating means, coupled to said comparator means and said data storage means, for revising said stored sample of past message data to include said messages collected by said counting means.

32. The apparatus of claim 31, wherein said statistically significant time period is one day, and said past message data comprises data from a preselected number of days.

33. The apparatus of claim 25, wherein said statistically unusual number of messages is detected by said comparator means whenever said number of messages is greater than said upper probability limit or is less than said lower probability limit.

34. The apparatus of claim 33, wherein said alarm means includes electronic mail sent to a system administrator.

* * * * *